June 9, 1931. J. N. LE JEUNE 1,809,786
PANEL MIRROR AND PICTURE MOUNTING
Filed July 11, 1929
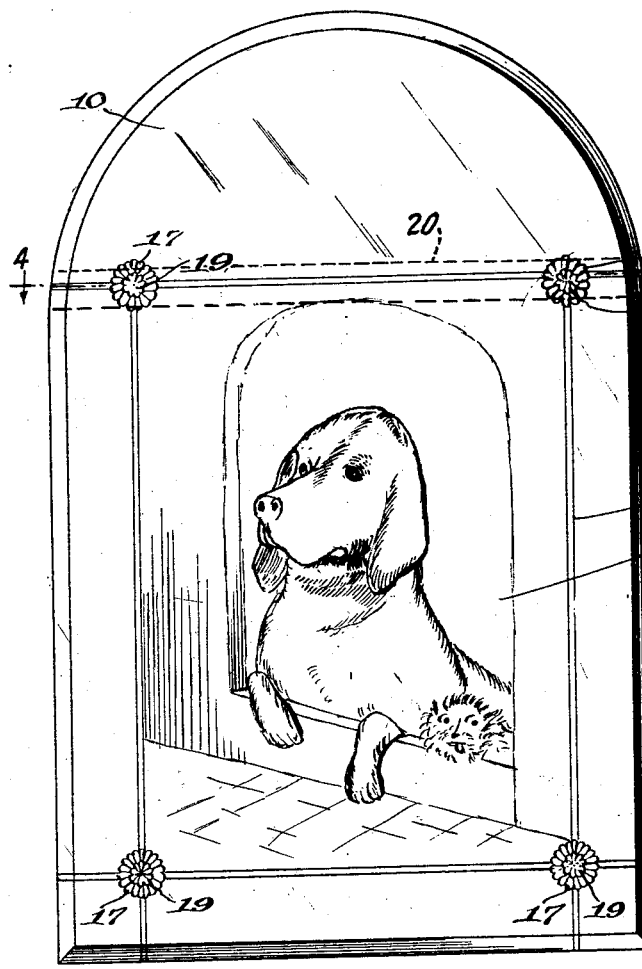
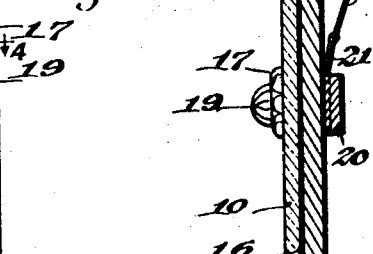
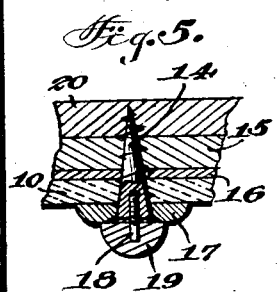
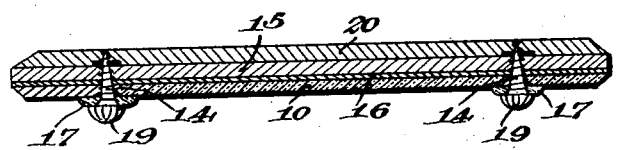
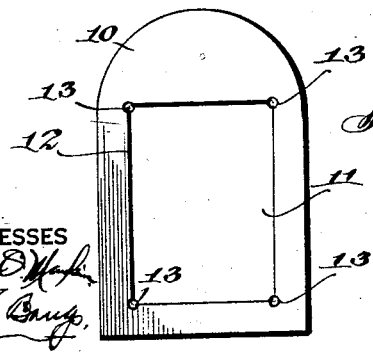
INVENTOR
James N. LeJeune,
BY
ATTORNEY Patented June 9, 1931

1,809,786

UNITED STATES PATENT OFFICE

JAMES N. LE JEUNE, OF NEW ORLEANS, LOUISIANA

PANEL MIRROR AND PICTURE MOUNTING

Application filed July 11, 1929. Serial No. 377,501.

This invention appertains to improvements in panel mirrors generally, and has for its main object to provide for the combining of a picture mounting with such a mirror, in addition to a hanger whereby, when suspended from the wall by the latter the picture will be exposed to view through an unsilvered portion of the mirror.

Another object of the invention is to provide a device of the class set forth wherein the picture exposing portion of the panel mirror is so arranged that portions of the silvered surface of the mirror form a border or frame about the picture, when the parts are brought into proper assembly.

A further object of the invention is the provision of a panel mirror, wherein the surface of the mirror will be ornamentally marked or etched about the outline of the picture exposing portion thereof so that the frame effect of the border silvered portions of the same will be distinctly emphasized and the entire structure thereby rendered more attractive and pleasing in appearance.

A still further object of the invention is to provide an opaque backing for the panel mirror so that the selected picture will be housed between the same against injury, or displacement from registered position with the exposing portion of the latter, when the parts are in assembly; and a fastening means for securing the parts in such assembly, wherein exposed portions of the fastenings at the outer side of the panel mirror will be of a decorative character, so as to readily harmonize with the marked or etched outline of the picture exposing portion aforesaid.

With the foregoing and other equally important objects and advantages in view, the invention resides in the certain new and useful combination, construction and arrangement of parts as will be hereinafter more fully described, set forth in the appended claims, and illustrated in the accompanying drawings, in which:

Figure 1 is a front elevation of a practical embodiment of the invention;

Figure 2 is a similar view of the panel mirror per se;

Figure 3 is an enlarged vertical longitudinal section;

Figure 4 is a horizontal section, taken on the line 4—4 of Figure 1; and

Figure 5 is an enlarged fragmentary section, showing one of the decorative fastenings employed for securing the parts in a completed panel unit together.

Referring to the drawings, wherein like characters of reference designate corresponding parts throughout the several views thereof, the embodiment of the invention, as illustrated therein by way of example, is constituted in a plate of glass 10, of any desired configuration and beveled on its edges if deemed expedient, which is silvered on its rear surface in a manner to provide an intermediate transparent portion 11 through which a picture is to be exposed to view. As shown in Figure 1, the outer surface of the glass may be marked or etched in any suitable manner somewhat as illustrated at 12, about the outline of the transparent portion thereof to emphasize the frame effect about a picture exposed at the latter portion and formed by the outer silvered portions surrounding the same.

Spaced about the edge of the transparent portion 11 of the glass 10 is a series of openings 13 for the insertion of suitable fastenings 14 inwardly through the same for the attaching of a backing 15 to the rear side thereof. These fastenings 14 are preferably in the form of screws which engage in the backing 15 in a manner to securely clamp the same to the rear side of the glass 10 and against the opposed side of a picture sheet 16 interposed therebetween. The backing sheet 15 may be made from wood or other material which will be readily penetrable by the screw fastenings aforesaid.

Each of these screw fastenings 14 preferably have ornamental members 17, such as glass rosettes or the like, secured beneath the heads thereof, and, in addition to the usual screw driver kerfs in these heads, the same also have holes drilled centrally inward of the kerfs for the engagement therewith of the screw threaded shanks 18 of other but smaller ornamental members or rosettes 19 which, when in position, cover the heads of the screws 14 and match up with the larger members or rosettes 17.

As shown in Figures 3 and 4, the upper of the screws 14 are made longer than the others thereof, so that they entirely pierce the backing 15 and engage in a transverse member or bar 20 to clamp the same tightly to the rear side of the backing and in order to sustain suitable hanger members 21 thereon, the latter including ring members 22 at their free ends to engage with suitable fastenings (not shown), such as nails or the like, for the suspension of a complete panel from a wall.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

I claim:

1. In a device of the class described, a mirror panel having an intermediate transparent area for the exposure to view therethrough of a picture positioned at the rear side thereof, a backing for said panel adapted to house the picture therebetween, means passing through said panel for securing said backing thereto, suspension means disposed at the rear side of said backing, and means for clamping said suspension means to the backing, said clamping means being held in place by certain of the securing means employed for securing the backing to said panel and acting as a reinforcement for the latter.

2. In a device of the class described, a mirror panel having an intermediate transparent area for the exposure to view thereof of a picture positioned at the rear side thereof, a backing for said panel adapted to house the picture therebetween, means spaced at each corner of the transparent area of the panel and passing through the same for securing the backing in position, suspension means carried at the rear side of said backing, a transverse strip at the rear side of said backing and engaged by certain of said securing means for clamping said suspension means in place, and ornamental devices secured to the front side of the panel by the securing means aforesaid, said ornamental devices being of a nature to harmonize with the mirrored area of the panel about the transparent area thereof.

JAMES N. LE JEUNE.